United States Patent [19]

Nightingale

[11] Patent Number: 4,732,324
[45] Date of Patent: Mar. 22, 1988

[54] VARIABLE FLOW AREA NOZZLE

[75] Inventor: Douglas J. Nightingale, Jonesboro, Ga.

[73] Assignee: Rolls-Royce Inc., New York, N.Y.

[21] Appl. No.: 683,675

[22] Filed: Dec. 19, 1984

[51] Int. Cl.$^4$ ............................................ B63H 11/00
[52] U.S. Cl. ......................... 239/265.29; 239/265.31; 239/265.41
[58] Field of Search ...................... 239/265.11, 265.19, 239/265.25, 265.29, 265.31, 265.39, 265.41; 244/12.4, 12.5, 23 D

[56] References Cited

U.S. PATENT DOCUMENTS

| | | | |
|---|---|---|---|
| 3,658,788 | 5/1972 | Oldfield et al. | 239/127.1 |
| 3,835,643 | 9/1974 | De Garcia, Jr. | 239/265.25 |
| 4,280,660 | 7/1981 | Wooten, Jr. et al. | 239/265.35 |
| 4,449,678 | 5/1984 | Hapke | 244/12.5 |
| 4,463,902 | 8/1984 | Nightingale | 239/265.37 |
| 4,552,309 | 11/1985 | Szuminski | 239/265.39 |

Primary Examiner—Donald P. Walsh
Attorney, Agent, or Firm—Cushman, Darby & Cushman

[57] ABSTRACT

A variable flow area nozzle suitable for a gas turbine engine equipped with afterburning means comprises first and second ducts, the second duct pivotably mounted to the first and extending downstream from the first duct thereby defining a fluid flow therethrough. The first duct includes a lip which extends downstream through the second duct, the lip being of width corresponding to the internal width of the second duct thereby defining an exit orifice the flow area of which is controlled by the position of the second duct with respect to the lip. The nozzle further comprises a pressurizable chamber located on a side of the lip remote from the fluid flow path, the chamber being defined at least in part by the lip and a portion of the second duct. A vent hole in the lip is provided for admitting fluid into the chamber from fluid flow path. Fluid pressure in the pressurizable chamber exerts a force on the second duct to provide a moment about the pivotal mounting of the second duct which to an extent counteracts a moment exerted by the fluid flowing through the nozzle. A second pressurizable chamber may also be used for the same purpose.

6 Claims, 5 Drawing Figures

VARIABLE FLOW AREA NOZZLE

The invention relates to a variable flow area nozzle of the type used in gas turbine aero-engines wherein the flow area of the propelling nozzle may be varied to achieve a desired pressure ratio across that nozzle.

It is known to augment the thrust of a gas-turbine aero-engine by providing it with an afterburner (reheat) system. Afterburning consists of the introduction and burning of fuel between the engine turbine and the jet pipe propelling nozzle utilizing the unburned oxygen in the exhaust gas to support combustion. The resultant increase in the temperature of the exhaust gas increases the velocity of gas stream leaving the propelling nozzle and therefore increases the engine thrust. To provide for operation under all conditions, an afterburning jet pipe is usually fitted with a variable area propelling nozzle. Such a nozzle prevents a significant increase in pressure occurring in the jet pipe when the afterburner is used which would affect the operation of the engine.

The Rolls-Royce 'Pegasus' vectored thrust turbofan gas turbine engine as installed in the Harrier aircraft (and its equivalents) has four propelling nozzles. Two 'cold' nozzles are mounted towards the front of the engine one on each side. By-pass air that has been compressed by the engine fan passes from a plenum chamber through the 'cold' nozzles. Two 'hot' nozzles are mounted at the rear of the engine to a bifurcated duct and pass hot gas which issues from the engine turbine. All the nozzles are arranged to be swivelled simultaneously to allow the jet efflux to be directed either downwards or rearwards or any position therebetween. The Harrier aircraft can thus vertically take-off and land and fly conventionally when the nozzles point rearward. To augment the thrust of the Pegasus engine it is possible to have an afterburner system in the bifurcated duct and a similar system in the plenum chamber between the fan and cold nozzles thus using bypass air to support combustion. For the reasons stated above such an augmented engine will require variable flow area propelling nozzles. While current designs of variable area nozzles are acceptable for engines with only a single propelling nozzle, a lighter design would be beneficial especially when four propelling nozzles are used. Furthermore to reduce the power that would be tapped from the engine in order to actuate all four area varying mechanism a variable area nozzle design with a reduced requirement for power is desirable. Also, in the Pegasus engine the area varying mechanism must be very reliable. For instance, if one nozzle was to become stuck at a particular flow area the aircraft could become very difficult to control.

Further use of variable area nozzles may be desired to control the pitch of the aircraft when hovering or when the forward speed or the aircraft is low by varying the ratio of front to rear nozzle thrust.

The present invention seeks to provide a variable flow area nozzle which has the potential to be lighter and simpler than current designs and that also consumes less power to effect changes in the flow area.

According to the present invention there is provided a variable flow area nozzle comprising: a first duct; a second, pivotably mounted, duct positioned downstream of the first duct and thereby defining a fluid flow path through the first and second ducts, the upstream end of the second duct being of similar internal section to the downstream end of the first duct, the first duct including a lip which extends downstream through the second duct, the lip surface being of width corresponding to the internal width of the second duct thereby defining an exit orifice the flow area of which is controlled by the position of the second duct with respect to the lip; a first pressurisable chamber located on a side of the lip remote from the fluid flow path, the chamber being defined at least in part by the lip and a portion of the second duct; and a means for admitting fluid into the chamber.

Preferably the first duct further comprises an inner liner located to define an annular passage through which fluid may flow from a remote source into the pressurisable chamber.

In a further embodiment the nozzle further comprises a second pressurisable chamber which is defined at least in part by the first and second ducts, the second pressurisable chamber being remote from the fluid flow path and on an opposite side of the second duct to the first chamber.

Preferably the fluid in the pressurisable chamber exerts a force on the second duct to provide a moment about the pivotal mounting of the second duct which to an extent counteracts a second moment, exerted about the pivotal mounting by the pressure of the fluid flowing through the second duct acting against a wall of the second duct which faces the lip of the first duct.

The invention will now be described by way of example with reference to the accompanying drawings in which:

FIG. 1 schematically depicts a vectored thrust turbofan gas turbine engine provided with four variable flow area nozzles according to the present invention;

Figure 1:
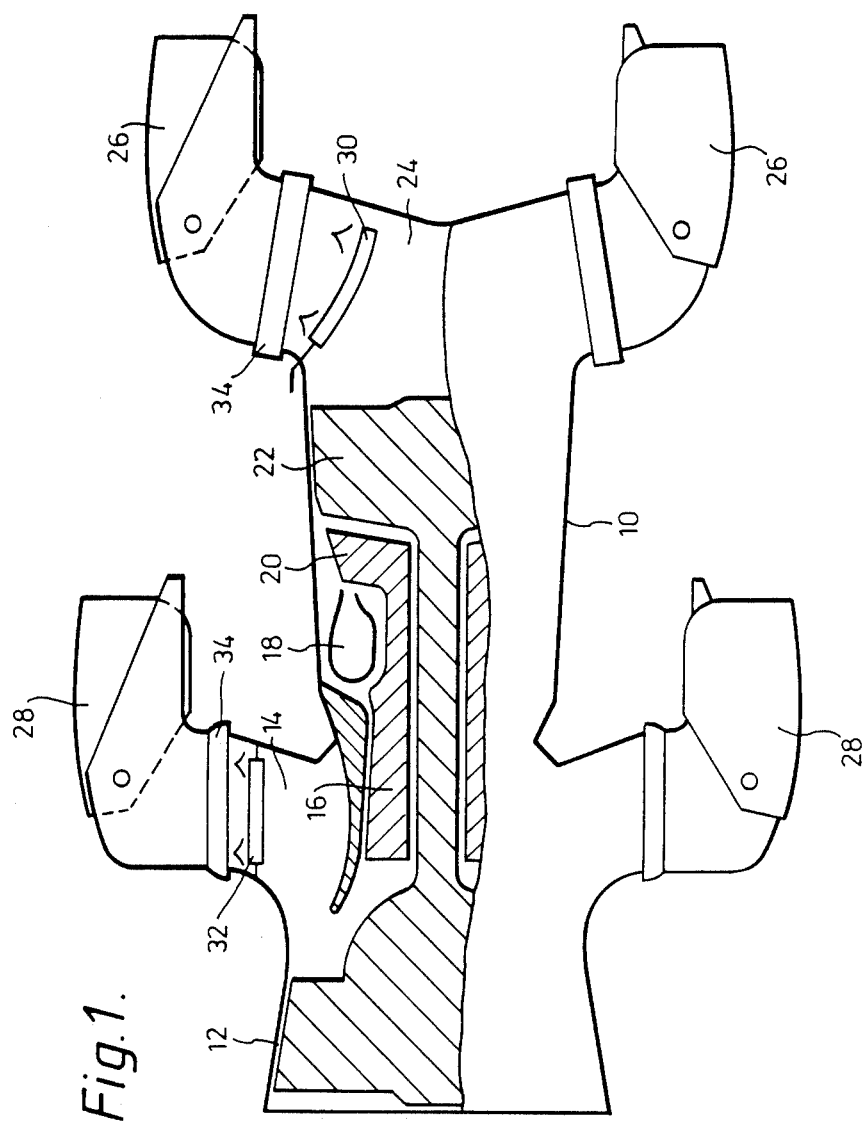

Referring now to FIG. 1 there is shown a vectored thrust turbofan engine 10. The engine 10 includes a Low Pressure (L.P.) fan 12 which provides compressed air to a plenum chamber 14 and a high pressure (H.P.) compressor 16. Air from the H.P. compressor passes to a combustion chamber 18 wherein fuel is burnt thereby heating the air passing through it. The heated high pressure gas then expands through a high pressure (H.P.) turbine 20 which drives the H.P. compressor 16. The hot gas then expands further in a Low Pressure (L.P.) turbine 22 which drives the L.P. fan 12. The exhaust stream from the L.P. turbine 22 then flows into a bifurcated duct 24 from where it passes to atmosphere via two vectorable 'hot' nozzles 26.

The remaining energy in the gas after passing through the L.P. turbine 22 is largely converted to kinetic energy in the nozzles 26 thereby producing thrust to propel an aircraft in which the engine 10 is installed. Air in the plenum chamber 14 passes through two 'cold' nozzles 28 to atmosphere, again the energy of the air is largely converted to kinetic energy in the nozzles 28 to produce thrust.

The engine 10 is further provided with an afterburner 30 which introduces fuel into the bifurcated duct 24 and provides means for its combustion with unburnt oxygen in the gas stream issuing from the L.P. turbine 22. A further means of thrust augmentation is provided by a Plenum Chamber Burning (P.C.B.) system 32 which introduces fuel into the plenum chamber 14 and as with the afterburner 30 provides for its combustion with the compressed air from the L.P. fan 12.

The four vectorable nozzles 26, 28 are each mounted in a respective bearing 34 that allows nozzles 26, 28 to be swivelled such that they may directed the jet efflux that issues from them downward or rearward or any point therebetween.

As described previously when the afterburner 30 and P.C.B. 32 are used it is necessary for the flow area of nozzles 26, 28 to be increased therefore they are variable flow area nozzles.

Figure 2:
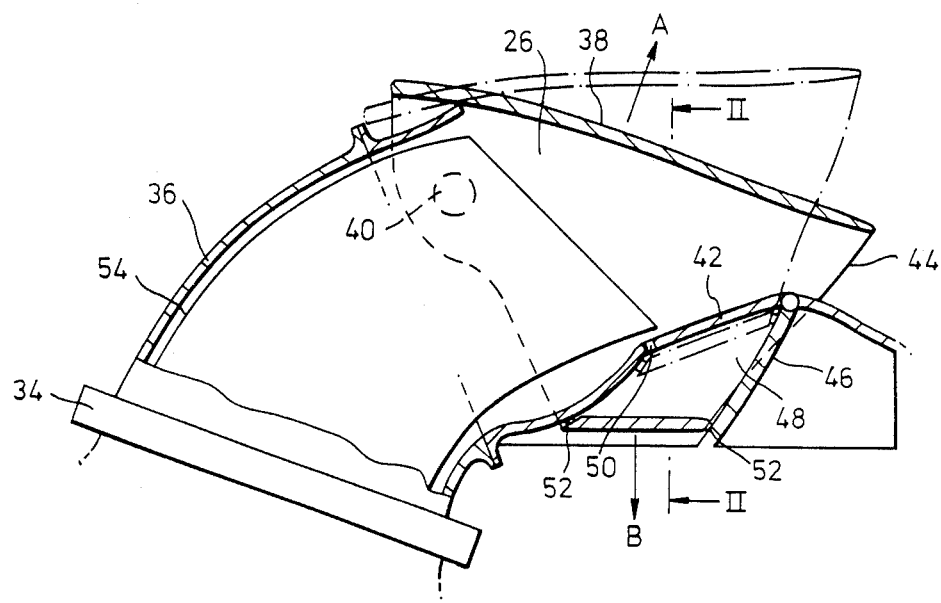
FIG. 2 shows in a sectional view one of the nozzles in FIG. 1 in greater detail.
Figure 3:
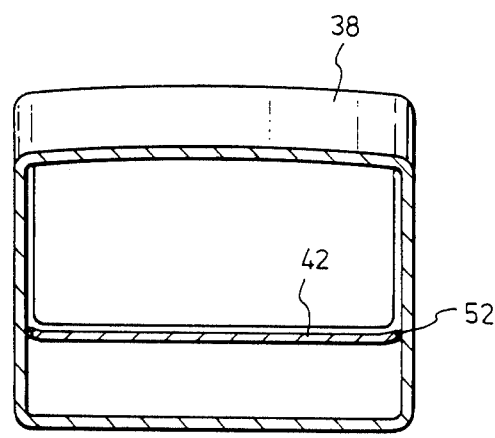
FIG. 3 shows a section along the line II—II in FIG. 2.

Referring now to FIGS. 2 and 3 there is shown the nozzle 26 in section. The nozzle 26 comprises a first duct 36 mounted in bearings 34, a second duct 38 which is mounted on first duct 36 at pivot 40, the second duct 38 being positioned downstream of the first duct 36.

The first duct 36 includes a lip 42 which extends downstream through the second duct 38 thereby defining an outlet orifice 44 at the downstream end of the second duct 38. The lip 42 includes a flange 46. A chamber 48 is thus formed extending between the first and second ducts 36, 38. A cooling liner 54 ensures a smooth transition of gas flow from the first duct 36 to the second duct 38, and protects the first duct 36 and the chamber 48 from the hot gases flowing through the nozzle 26. Cooling air, from the engine compressor 16 or fan 12, is directed through the annular space between the cooling liner 54 and the first duct 36 to keep the liner 54 cool. A vent hole 50 is provided in the lip 42 to allow the cooling air to bleed into the chamber 48.

A plurality of wiping seals 52 are provided to reduce leakage from the chamber.

Figure 4:
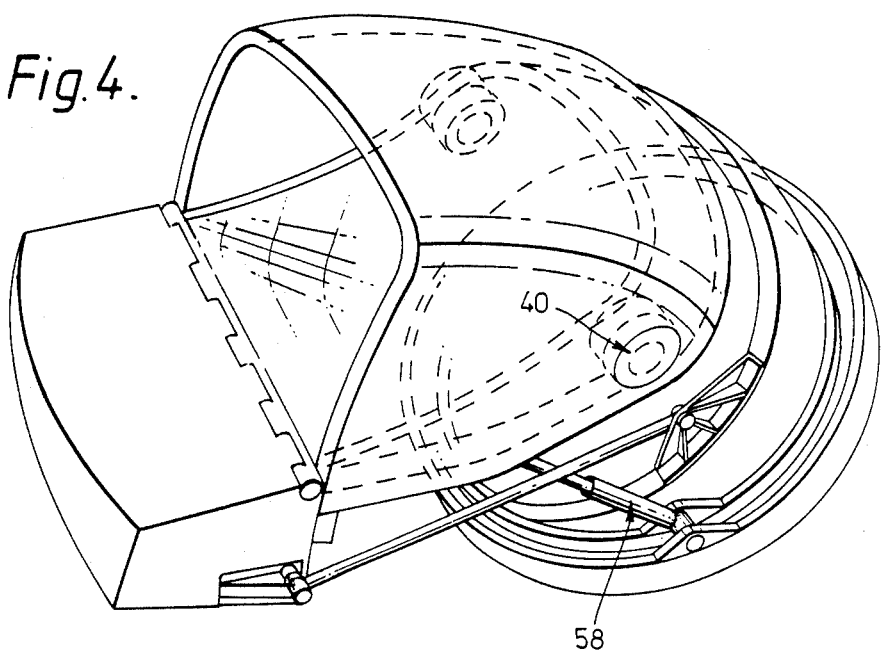
FIG. 4 is a pictorial view of the nozzle in FIG. 2.

To effect a change in the nozzle flow area the second duct 38 is rotated about pivot 40 by suitable means such as a ballscrew jack 58 shown in FIG. 4. Referring back to FIG. 2 the positions of maximum and minimum nozzle area are shown in broken and bold line respectively.

In operation the exhaust gases passing through nozzle 26 will exert a force on the second duct 30 in the direction of arrow A in FIG. 2. This force will exert an anticlockwise moment about the pivot 40. Gas pressure in the chamber 48, which will be higher than the gas pressure passing through the nozzle, will also exert a force on the second duct 38 but in the direction of arrow B. The gas pressure in the chamber 48 will therefore exert a clockwise moment about the pivot 40. It is therefore possible to reduce the resultant moment about the pivot so that the force exerted by the ballscrew jack 58 to vary the area of the nozzle is quite small.

Figure 5:
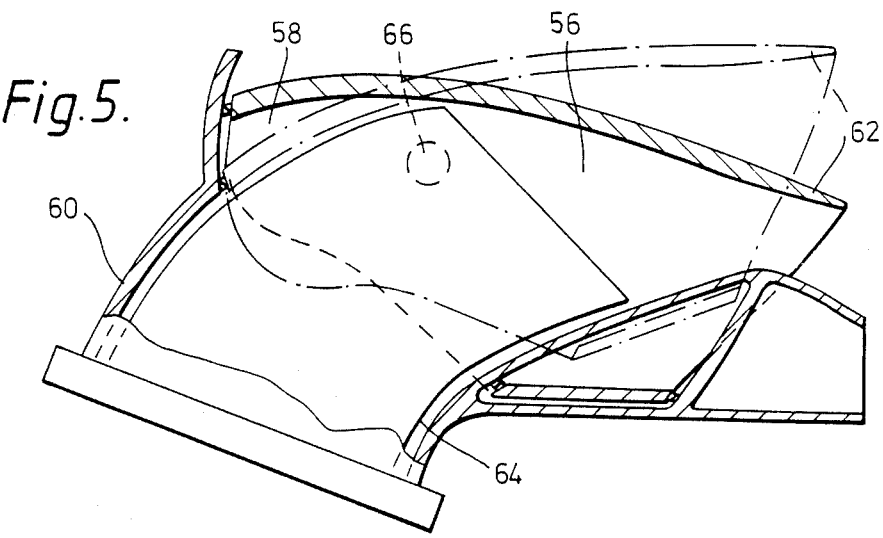
FIG. 5 is a sectional view of a second embodiment of a nozzle according to the present invention.

FIG. 5 shows a second embodiment of the invention wherein a nozzle 56 has a second chamber 58 which extends between a first duct 60, a second duct 62 and a cooling liner 64. The second chamber is supplied with cooling air, via the annular space between the liner 64 and the first duct 60, which acts on the second duct 62 to provide a second clockwise moment about the pivotal mounting 66 of the second duct 62. The resultant moment about the pivot 66 due to gas pressures is thus further reduced and may even be zero at certain engine speeds.

It will be understood that the invention is equally applicable to gas turbine engines with a single propelling nozzle. Furthermore the invention may be used with engines that are not equipped with afterburner systems but where a variable area nozzle is desired to optimise the thrust generated by the engine.

I claim:

1. A variable flow area nozzle comprising:
a first duct;
a second, pivotably mounted, duct positioned downstream of the first duct and thereby defining a fluid flow path through the first and second ducts, the upstream end of the second duct being of similar internal section to the downstream end of the first duct, the first duct including a lip which extends downstream through the second duct, the lip being of width corresponding to the internal width of the second duct thereby defining an exit orifice the flow area of which is controlled by the position of the second duct with respect to the lip;
a first pressurisable chamber located on a side of the lip remote from the fluid flow path, the chamber being defined at least in part by the lip and a portion of the second duct;
and a means for admitting fluid into the chamber, said means comprising at least one vent hole in the lip through which fluid from the first duct passes into the chamber.

2. A nozzle as claimed in claim 1 wherein the first duct further comprises an inner liner located to define an annular passage through which fluid may flow from a remote source into the pressurisable chamber.

3. A nozzle as claimed in claim 1 or claim 2 wherein the nozzle further comprises a second pressurisable chamber which is defined at least in part by the first and second ducts, the second pressurisable chamber being remote from the fluid flow path and on an opposite side of the second duct to the first chamber.

4. A nozzle as claimed in claim 1 or claim 3 wherein fluid in at least one pressurisable chamber exerts a force on the second duct to provide a moment about the pivotal mounting of the second duct which to an extent counteracts a second moment, exerted about the pivotal mounting, by the pressure of the fluid flowing through the second duct acting against a wall of the second duct which faces the lip of the first duct.

5. A nozzle as claimed in claim 1 wherein the first and second ducts are of substantially rectangular section.

6. A nozzle as claimed in claim 1 wherein the first duct is located in a bearing thereby facilitating variation in the direction of flow issuing from the exit orifice.

* * * * *